United States Patent [19]

Neely, Jr.

[11] 4,066,466

[45] Jan. 3, 1978

[54] LOW POLLUTION GLASS FIBER COMPOSITIONS

[75] Inventor: Homer E. Neely, Jr., Tarentum, Pa.

[73] Assignee: PPG Industries, Inc., Pittsburgh, Pa.

[21] Appl. No.: 707,907

[22] Filed: July 22, 1976

[51] Int. Cl.$^2$ .................. C03C 13/00; C03C 3/08
[52] U.S. Cl. ........................................ 106/50; 106/54
[58] Field of Search ...................................... 106/50, 54

[56] References Cited

U.S. PATENT DOCUMENTS

| | | | |
|---|---|---|---|
| 2,571,074 | 10/1951 | Tiede et al. | 106/50 |
| 2,681,289 | 6/1954 | Moore | 106/50 |
| 3,095,311 | 6/1963 | von Wranau et al. | 106/50 |
| 3,166,428 | 1/1965 | Thomas | 106/50 |
| 3,687,850 | 8/1972 | Gagin | 106/50 |
| 3,817,764 | 6/1974 | Wolf | 106/50 |
| 3,847,627 | 11/1974 | Erickson | 106/50 |
| 3,876,481 | 4/1975 | Erickson et al. | 106/50 |
| 3,887,386 | 6/1975 | Majumdar | 106/50 |
| 3,892,581 | 7/1975 | Burgman et al. | 106/50 |
| 3,900,306 | 8/1975 | Brueggemann | 106/50 |

FOREIGN PATENT DOCUMENTS

| | | |
|---|---|---|
| 48-37411 | 6/1973 | Japan. |
| 7,403,226 | 9/1974 | Netherlands. |
| 254,127 | 3/1964 | Netherlands. |

*Primary Examiner*—Patrick P. Garvin
*Assistant Examiner*—Mark Bell
*Attorney, Agent, or Firm*—Alan T. McDonald; John E. Curley

[57] ABSTRACT

Novel glass fiber forming compositions are disclosed having a reduced fluorine level. These compositions substantially reduce emissions of fluorine containing gas from glass furnaces when the batch is melted. Lithium oxide is added to the novel composition to reduce the softening point and liquidus temperatures of the composition. The resultant composition is found to be a highly desirable glass which when melted can be used to produce glass fibers having excellent tensile strength.

6 Claims, No Drawings

LOW POLLUTION GLASS FIBER COMPOSITIONS

BACKGROUND OF THE INVENTION

Glass fibers are typically formed from either "621" or "E" glass compositions.

"621" glass has a composition of:

| Component | Percent by Weight |
|---|---|
| $SiO_2$ | 52–56 |
| $Al_2O_3$ | 12–16 |
| $CaO$ | 19–25 |
| $B_2O_3$ | 8–13 | as disclosed in U.S. Patent No. 2,571,074. This glass also includes such impurities as $Fe_2O_3$, $SrO$, $K_2O$, $Na_2O$, $Li_2O$. The glass additionally may contain $CaF_2$.

"E" glass has a composition of:

| Component | Percent by Weight |
|---|---|
| $SiO_2$ | 52–56 |
| $Al_2O_3$ | 12–16 |
| $MgO$ | 3–6 |
| $CaO$ | 16–19 |
| $B_2O_3$ | 9–11 | and includes the same impurities as the "621" glass. In these compositions, fluorine is added to the batch to be melted into glass as $CaF_2$. The amount of fluorine in the glass batch often approaches 2 percent by weight or more. As the glass is melted, much of the fluorine in the batch materials is volatilized and driven off as a fluorine containing gas in the stack. Fluorine containing gases are highly corrosive materials and are known sources of pollution. Further, the fluorine component of the glass acts to raise the liquidus temperature of the glass.

However, $CaF_2$ acts as a flux in melting the glass, and helps reduce the softening point temperature of glass compositions. Control of liquidus and softening point temperatures is vital in the formation of glass filaments, as these factors, as is well known in the art, help determine the temperatures at which the glass fiber forming operation must be carried out. As these temperatures rise, the temperatures of operation must also rise, thus resulting in added fuel costs and shorter life for the furnace, bushing, and other associated equipment. Thus, it is highly desirable to replace the fluorine components of the glass batch, and to replace them with a material which itself will help reduce the softening and the liquidus temperature of the glass composition and thus help reduce fuel consumption, in addition to reducing fluorine pollution.

THE PRESENT INVENTION

The present invention provides a glass composition for glass fibers which is formed from glass batches having reduced fluorine in the batch. The reduced fluorine in the batch reduces fluorine emissions in the stack gases of glass furnaces. At the same time, the glass batch is composed of ingredients which reduce the softening and liquidus temperatures of the glass composition produced when that composition is compared to those of "E" glass and "621" glass. The glasses of the present invention have the following composition:

| Component | Percent by Weight |
|---|---|
| $SiO_2$ | 52–57 |
| $Al_2O_3$ | 12–16 |
| $Fe_2O_3$ | 0–0.5 |
| $MgO$ | 0–6 |
| $CaO$ | 16–25 |
| $SrO$ | 0–2 |
| $TiO_2$ | 0–0.7 |
| $B_2O_3$ | 6.5–13 |
| $Na_2O$ | 0–1.5 |
| $K_2O$ | 0–0.3 |
| $Li_2O$ | 0.1–0.5 |
| $F_2$ | 0–0.4 |
| $ZrO_2$ | 0–0.1 |

Components $Fe_2O_3$, $SrO$, $TiO_2$, $K_2O$ and $ZrO_2$ occur only as trace impurities in the composition and ideally would not be present. $MgO$ and $Na_2O$ may be present as trace impurities or may be purposely added to the composition.

A preferred range for the components of the glass composition of the present invention is:

| Component | Percent by Weight |
|---|---|
| $SiO_2$ | 53.5–57 |
| $Al_2O_3$ | 13–15 |
| $Fe_2O_3$ | 0–0.3 |
| $MgO$ | 0–6 |
| $CaO$ | 16–25 |
| $SrO$ | 0–0.5 |
| $TiO_2$ | 0–0.5 |
| $B_2O_3$ | 7–9 |
| $Na_2O$ | 0.4– |
| $K_2O$ | 0–0.3 |
| $Li_2O$ | 0.1–0.5 |
| $F_2$ | 0–0.4 |
| $ZrO_2$ | 0–0.1 |

The most preferred range of the present glass compositions is:

| Component | Percent by Weight |
|---|---|
| $SiO_2$ | 53.5–57 |
| $Al_2O_3$ | 13–15 |
| $Fe_2O_3$ | 0 |
| $MgO$ | 0–6 |
| $CaO$ | 16–25 |
| $SrO$ | 0 |
| $TiO_2$ | 0 |
| $B_2O_3$ | 7–9 |
| $Na_2O$ | 0.4–1 |
| $K_2O$ | 0 |
| $Li_2O$ | 0.1–0.5 |
| $F_2$ | 0.1–0.4 |
| $ZrO_2$ | 0 |

The reduction of fluorine to not more than 0.4 percent by weight in the glass composition has a substantial effect on the fluorine containing gas emissions normally encountered in melting conventional glass batch used to manufacture glass fibers. It has been found that the reduction in emissions is greater than directly proportional to the amount of fluorine removed from the batch. Thus, removing approximately 70 percent of the fluorine from the glass melt batch will result in better than a 70 percent reduction in fluorine gas emissions and may, in fact, approach a 90 percent reduction. Of course, complete removal of fluorine will be completely eliminate fluorine gas emissions. However, it is often desirable or necessary to retain some fluorine in the composition for its other desirable effects.

$Li_2O$ is employed as the fluxing agent as a substitute for the fluorine which has been removed. Lithium oxide has the desired property of reducing liquidus and softening temperatures of a glass composition. However, the addition of any alkali oxide to a glass fiber forming composition must be limited, since its addition adversely effects the highly desirable electrical properties of the glass fibers and, if employed in excess, would make the fibers unsuitable for such uses as electrical circuit board reinforcement and the like. Further, the alkali oxides are soluble in water and can be dissolved out of the glass fibers, especially with the large surface to volume ratio of glass fibers. Dissolving these components out of the formed glass fiber can reduce tensile strength of the fiber substantially, if the alkali oxide components become excessive. For these reasons, it is desirable to limit the addition of $Li_2O$ to between about 0.1 and 0.5 percent by weight to keep the total alkali oxide percent by weight relatively low.

EXAMPLES

The following glass batch compositions were prepared:

TABLE I

| Example No. | 1 | 2 | 3 | 4 | 5 | 6 | 7 |
| --- | --- | --- | --- | --- | --- | --- | --- |
| Weight (grams) | | | | | | | |
| Silica | 184.4 | 183.3 | 183.6 | 182.2 | 182.4 | 182.5 | 182.1 |
| Clay | 167.7 | 167.0 | 167.3 | 166.0 | 166.3 | 166.2 | 165.9 |
| Limestone | 126.0 | 143.1 | 139.5 | 142.2 | 138.7 | 144.3 | 144.0 |
| Fine Colemanite | 98.9 | 98.2 | 98.3 | 97.6 | 97.7 | 97.7 | 97.5 |
| Fluorspar | 14.7 | 1.5 | 4.4 | 1.5 | 4.4 | — | — |
| Lithium Carbonate | — | — | — | 3.6 | 3.6 | 2.4 | 3.6 |
| Sodium Sulfate | 6.2 | 5.0 | 5.0 | 5.0 | 5.0 | 5.0 | 5.0 |
| Ammonium Sulfate | 1.4 | 1.4 | 1.4 | 1.4 | 1.4 | 1.4 | 1.4 |
| Coal | 0.6 | 0.5 | 0.5 | 0.5 | 0.5 | 0.5 | 0.5 |
| Total (grams) | 599.9 | 600.0 | 600.0 | 600.0 | 600.0 | 600.0 | 600.0 |

These batches were placed in crucibles and heated for 6 hours at 2,700° F. (1,482.2° C) to melt the batches into glass. The glasses formed were then analyzed for their chemical constituents, their liquidus and softening points were determined and the results are set forth in Table II.

| Example No. | 1 | 2 | 3 | 4 | 5 | 6 | 7 |
| --- | --- | --- | --- | --- | --- | --- | --- |
| Analysis % by Weight | | | | | | | |
| $SiO_2$ | 56.85 | 56.67 | 56.22 | 56.54 | 56.05 | 56.50 | 56.84 |
| $Al_2O_3$ | 13.10 | 13.25 | 13.31 | 13.19 | 13.31 | 13.24 | 13.02 |
| $Fe_2O_3$ | 0.27 | 0.27 | 0.27 | 0.27 | 0.27 | 0.27 | 0.27 |
| MgO | 0.42 | 0.39 | 0.40 | 0.39 | 0.38 | 0.38 | 0.40 |
| CaO | 19.41 | 19.51 | 19.73 | 19.54 | 19.69 | 19.60 | 19.40 |
| SrO | 0.17 | 0.16 | 0.16 | 0.16 | 0.16 | 0.16 | 0.16 |
| $TiO_2$ | 0.44 | 0.45 | 0.46 | 0.45 | 0.46 | 0.45 | 0.45 |
| $B_2O_3$ | 8.11 | 8.45 | 8.56 | 8.26 | 8.48 | 8.47 | 8.38 |
| $Na_2O$ | 0.64 | 0.56 | 0.50 | 0.57 | 0.51 | 0.49 | 0.49 |
| $K_2O$ | 0.23 | 0.22 | 0.22 | 0.22 | 0.22 | 0.22 | 0.22 |
| $Li_2O$ | — | — | — | 0.31 | 0.31 | 0.21 | 0.30 |
| $F_2$ | 0.63 | 0.13 | 0.27 | 0.12 | 0.26 | — | — |
| $ZrO_2$ | 0.05 | 0.05 | 0.05 | 0.05 | 0.05 | 0.05 | 0.05 |
| Total | 100.33 | 100.11 | 100.16 | 100.08 | 100.15 | 100.05 | 99.98 |
| $O_2$ Corrections | 0.26 | 0.06 | 0.11 | 0.05 | 0.11 | 0.00 | 0.00 |
| | 100.07 | 100.05 | 100.05 | 100.03 | 100.04 | 100.05 | 99.98 |
| Liquidus, ° F. | 2126 | 2069 | 2096 | 2064 | 2039 | 2092 | 2095 |
| ° C. | 1163.3 | 1131.7 | 1146.7 | 1128.9 | 1115.0 | 1144.4 | 1146.1 |
| Softening Point, ° F. | 1540 | 1568 | 1558 | 1531 | 1517 | 1545 | 1546 |
| ° C. | 837.8 | 853.3 | 847.8 | 832.8 | 825.0 | 840.6 | 841.1 |

The $O_2$ correction is based upon reporting fluorine as $F_2$ while reporting all other components as oxides. Since no $F_2$ was found in Examples 6 and 7, no $O_2$ correction was necessary.

Example 1 illustrates a typical "621" type glass composition.

Examples 2 and 3 illustrate "621" type compositions with the fluorine components reduced to 0.13 and 0.27 percent by weight, respectively with no substitution of $Li_2O$ for the fluorine. As can be seen from these examples, the liquidus temperatures of these compositions have been reduced, however, the softening points have been substantially raised above that of Example 1, 28° F. (15.5° C) and 18° F. (10° C) respectively. This is an undesirable result, since a substantial increase in softening point require substantially higher operating temperatures in the furnace and at the bushing, thus reducing their potential lives.

Examples 4 illustrates a glass of the "621" type, according to the present invention and in which the fluorine component has been reduced to 0.12 percent with the addition of lithium oxide in an amount of 0.31 percent. This glass shows a reduction in liquidus temperature of 62° F. (34.4° C) and a reduction in softening point temperature of 9° F. (5° C) over the glass composition of Example 1, a highly desirable result.

Example 5 illustrates a "621" type glass with fluorine at 0.26 percent by weight and $Li_2O$ at 0.31 percent by weight. This glass shows a reduction in liquidus temperature of 87° F. (48.3° C) and a reduction of softening point temperature of 23° F. (12.8° C) from those temperatures of Examples 1, an even better result than Example 4.

Examples 6 and 7 illustrate a "621" type glass according to the present invention including a complete elimination of the fluorine component coupled with an addition of lithium oxide in amounts of 0.21 and 0.30 weight percent respectively. These glasses show a reduction in liquidus temperature of 34° F. (18.9° C) and 31° F. (17.2° C), respectively, and a slight increase in softening point temperature of 5° F. (2.8° C) and 6° F. (3.3° C), respectively. While these glasses were not preferred, if complete fluorine elimination is found necessary, the slight increase in softening point temperature would not severely harm the fiber glass batch melting and filament formation and thus could be tolerated. Note that these glasses have significantly lower softening points than Examples 2 and 3, which still contain some fluorine but contain no lithium oxide.

The tensile strength of filaments formed from these glasses as tested when melted 2,700° F. (1,482.2° C) for 6 hours and attenuated into filaments are as follows:

TABLE III

| Example No. | Tensile Strength, KPSI |
|---|---|
| 1 | 493 |
| 2 | 508 |
| 3 | 498 |
| 4 | 515 |
| 5 | 513 |
| 6 | 515 |
| 7 | 501 |

The differences in tensile strength are believed to be insignificant, being within the realm of experimental error. Thus, the addition of lithium oxide and the reduction in fluorine in the amounts of the present invention do not appear to affect the tensile strength of the fibers being formed, i.e., lower or raise them, to any significant extent.

From the foregoing, it is obvious that the present invention provides a glass fiber forming composition which reduces the fluorine component in the batch, thus reducing fluorine containing gas emissions, without effecting the tensile strength of the filaments produced and without substantially harming the operation conditions of the furnace and bushing.

I claim:

1. A glass composition consisting essentially of:

| Component | Percent by Weight | | |
|---|---|---|---|
| $SiO_2$ | 53.5 | – | 57 |
| $Al_2O_3$ | 13 | – | 15 |
| MgO | 0 | – | 6 |
| CaO | 16 | – | 25 |
| $B_2O_3$ | 7 | – | 9 |
| $Na_2O$ | 0.4 | – | 1 |
| $Li_2O$ | 0.1 | – | 0.5 |
| $F_2$ | 0.1 | – | 0.4 |

2. A glass filament having a composition consisting essentially of:

| Component | Percent by Weight | | |
|---|---|---|---|
| $SiO_2$ | 53.5 | – | 57 |
| $Al_2O_3$ | 13 | – | 15 |
| MgO | 0 | – | 6 |
| CaO | 16 | – | 25 |
| $B_2O_3$ | 7 | – | 9 |
| $Na_2O$ | 0.4 | – | 1 |
| $Li_2O$ | 0.1 | – | 0.5 |
| $F_2$ | 0.1 | – | 0.4 |

3. A glass composition consisting essentially of:

| Component | Percent by Weight |
|---|---|
| $SiO_2$ | 56.05 |
| $Al_2O_3$ | 13.31 |
| $Fe_2O_3$ | 0.27 |
| MgO | 0.38 |
| CaO | 19.69 |
| SrO | 0.16 |
| $TiO_2$ | 0.46 |
| $B_2O_3$ | 8.48 |
| $Na_2O$ | 0.51 |
| $K_2O$ | 0.22 |
| $Li_2O$ | 0.31 |
| $F_2$ | 0.26 |
| $ZrO_2$ | 0.05 |

4. A glass filament having a composition consisting essentially of:

| Component | Percent by Weight |
|---|---|
| $SiO_2$ | 56.05 |
| $Al_2O_3$ | 13.31 |
| $Fe_2O_3$ | 0.27 |
| MgO | 0.38 |
| CaO | 19.69 |
| SrO | 0.16 |
| $TiO_2$ | 0.46 |
| $B_2O_3$ | 8.48 |
| $Na_2O$ | 0.51 |
| $K_2O$ | 0.22 |
| $Li_2O$ | 0.31 |
| $F_2$ | 0.26 |
| $ZrO_2$ | 0.05 |

5. A glass composition consisting essentially of:

| Component | Percent by Weight |
|---|---|
| $SiO_2$ | 56.54 |
| $Al_2O_3$ | 13.19 |
| $Fe_2O_3$ | 0.27 |
| MgO | 0.39 |
| CaO | 19.54 |
| SrO | 0.16 |
| $TiO_2$ | 0.45 |
| $B_2O_3$ | 8.26 |
| $Na_2O$ | 0.57 |
| $K_2O$ | 0.22 |
| $Li_2O$ | 0.31 |
| $F_2$ | 0.12 |
| $ZrO_2$ | 0.05 |

6. A glass filament having a composition consisting essentially of: Fe

| Component | Percent by Weight |
|---|---|
| $SiO_2$ | 56.54 |
| $Al_2O_3$ | 13.19 |
| $Fe_2O_3$ | 0.27 |
| MgO | 0.39 |
| CaO | 19.54 |
| SrO | 0.16 |
| $TiO_2$ | 0.45 |
| $B_2O_3$ | 8.26 |
| $Na_2O$ | 0.57 |
| $K_2O$ | 0.22 |
| $Li_2O$ | 0.31 |
| $F_2$ | 0.12 |
| $ZrO_2$ | 0.05 |

* * * * *

UNITED STATES PATENT AND TRADEMARK OFFICE
CERTIFICATE OF CORRECTION

PATENT NO. : 4,066,466
DATED : January 3, 1978
INVENTOR(S) : Homer E. Neely, Jr.

It is certified that error appears in the above-identified patent and that said Letters Patent are hereby corrected as shown below:

Column 6, line 45, - Claim 6 "A glass filament having a composition consisting essentially of: Fe" should read --A glass filament having a composition consisting essentially of:--.

Column 2, lines 22 through 34 "Component $Na_2O$, Percent by Weight 0.4- " should read --Component $Na_2O$, Percent by Weight 0.4-1--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks